March 18, 1969
C. MICHELSON
3,433,562
COLOR CINEMATOGRAPHIC FILM
Filed Jan. 19, 1967
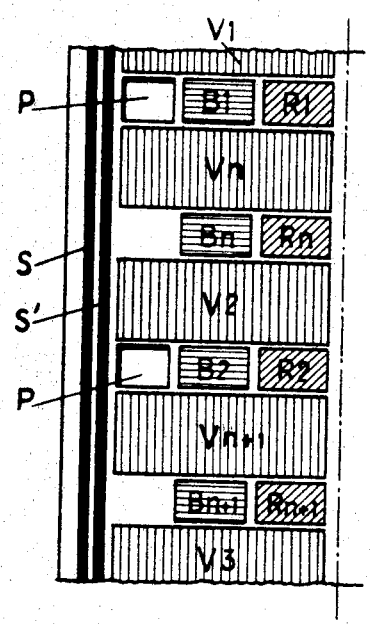
Inventor
Charles Michelson
By
Watson, Cole, Grindle & Watson
Attorneys

United States Patent Office 3,433,562
Patented Mar. 18, 1969

3,433,562
COLOR CINEMATOGRAPHIC FILM
Charles Michelson, Paris, France, assignor to
Teverama S.A.
Filed Jan. 19, 1967, Ser. No. 610,405
Claims priority, application France Jan. 20, 1966, 46,654;
Apr. 5, 1966, 56,517
U.S. Cl. 352—234        6 Claims
Int. Cl. G03b 1/76

ABSTRACT OF THE DISCLOSURE

A color cinematographic film applying the three-color additive process and bearing groups of three conjugate, elementary, black-and-white images corresponding to a single, projected, color, composite image, characterized in that: (i) the elementary images of the same group are of different size, the "green" one being the largest, (ii) the large "green" images project laterally into the space between successive perforations and are longitudinally spaced from each other to leave an interval therebetween, and (iii) the smaller "blue" and "red" images are positioned side-by-side in the interval between the green images.

Background of the invention

The invention relates to a cinematographic film which can be of standard small format and which permits a multi-color projection by the known three-color additive process for color films. The recourse to this process has the interest resulting from the use of black-and-white films which are cheap.

In such films, corresponding to each composite color cinematographic image to be formed on the screen is a group of three conjugate, elementary black-and-white images disposed side-by-side on the film but distributed in such a way that two elementary images of like "color" belonging to two composite images to be successively projected, are not adjacent, but are separated by a longitudinal interval corresponding to at least one elementary image of different "color." Thus, the three conjugate elementary images of the same group can have on the film a distribution such that one of the elementary images and the two others are found consecutively in the longitudinal direction, these latter two images being juxtaposed in the transverse direction.

Summary of the invention

According to the present invention, elementary images of different size are adopted in a same group: more specifically, the "green" image is much larger than the "blue" and "red" images. The large "green" image even projects in width over the row of film perforations and will partly be included in the longitudinal space available between successive perforations, in which case the "blue" and "red" images of reduced size, will preferably be situated side-by-side in the transverse direction at the longitudinal level of a perforation.

Advantage is thus taken of the transverse space available at this level for arranging therein two small "blue" and "red" images corresponding to a larger "green" image occupying the width of the film as far as the alignment of the outer borders of the perforations or even beyond such borders. This large "green" image will preferably be anamorphosized by contraction of its dimension longitudinally of the film. Of course, the small "blue" and "red" images could also be anamorphosized.

Brief description of the drawing

The single figure is a half view of a film with an arrangement of the images according to the invention.

Description of the preferred embodiment

In the drawing, the elementary black-and-white images corresponding respectively to blue, green and red, are represented by the letters B, V and R, the "blue" image bearing horizontal hatching lines, the "green" image vertical hatching lines and the "red" image oblique hatching lines. S and S' represent the sound tracks and P the perforations.

Elementary images of distinctly different size are adopted. More specifically, the "green" image V which, as is known, must have the best definition, taking into account considerations peculiar to the eye, is relatively large, while the "blue" image B and "red" image R, which do not have to have as good a definition for a satisfactory viewing in colors, are of much smaller size. The image V, which is anamorphosized, projects in width on to the row of perforations P and is positioned in the longitudinal space available between successive perforations; the much smaller images B and R are then disposed side-by-side in the interval separating the large images V, made necessary by the presence of the perforations P.

Contrary to that which is shown in the figure, the two other images B and R, corresponding to blue and red, are not necessarily of the same size and the blue image B is conveniently smaller. Satisfactory results were obtained with a "blue" image B which is half as large as the "red" image R.

Anamorphosis of the images does not necessarily affect all three elementary images with a uniform degree of anamorphosis. Thus, in one embodiment, the "green" image V was contracted longitudinally with respect to the film in the ratio of 2:1, while the small "blue" image B and "red" image R were only contracted in the same direction in the ratio of 3:2.

I claim:
1. A color cinematographic film having a row of perforations and bearing groups of three conjugate elementary black-and-white images designed to be projected to form a single color composite image, said elementary images being disposed side-by-side but distributed in such manner that elementary images of like "color" belonging to two groups to be projected successively are separated by a longitudinal interval containing at least one elementary image of different "color," wherein the improvement lies in that:
  the elementary images of a same group are of substantially different size, the elementary image corresponding to green being the largest,
  said large "green" image projects in width on to said row of perforations and is positioned in the longitudinal space available between successive perforations, and
  the "blue" and "red" images of relatively small size are situated side-by-side in the transverse direction in the longitudinal interval between said large "green" images.

2. Color film according to claim 1, in which the two elementary images, corresponding respectively to blue and red, are of different size, the "blue" image being the smaller.

3. Film according to claim 2, in which the "blue" elementary image is half as large as the "red" elementary image.

4. Film according to claim 1, in which the elementary images are anamorphosized by contraction longitudinally relatively to the film, the degree of anamorphosis not being the same for the three elementary images.

5. Film according to claim 4, in which the large elementary image corresponding to green is contracted in the ratio of substantially 2:1.

6. Film according to claim 4, in which the small "blue" and "red" elementary images are contracted in the ratio of substantially 3:2.

References Cited

UNITED STATES PATENTS

| | | | |
|---|---|---|---|
| 1,324,122 | 12/1919 | Killman | 352—240 |
| 1,402,668 | 1/1922 | Shaw | 352—234 |
| 1,581,834 | 4/1926 | Bovin | 352—234 |

NORTON ANSHER, *Primary Examiner.*

MONROE H. HAYES, *Assistant Examiner.*

U.S. Cl. X.R.

352—239